United States Patent [19]

Blom et al.

[11] Patent Number: 4,593,321
[45] Date of Patent: Jun. 3, 1986

[54] METHOD OF ADJUSTING THE CURRENT INTENSITY OF AN ELECTRON BEAM IN A PICKUP TUBE AND TELEVISION CAMERA SYSTEM SUITABLE THEREFOR

[75] Inventors: Hendrik Blom; Filippus L. Stok; Engbert Tienkamp, all of Breda, Netherlands

[73] Assignee: U.S. Philips Corporation, New York, N.Y.

[21] Appl. No.: 536,420

[22] Filed: Sep. 27, 1983

[30] Foreign Application Priority Data

Oct. 19, 1982 [NL] Netherlands .................... 8204022

[51] Int. Cl.⁴ .......................................... H04N 5/235
[52] U.S. Cl. ................... 358/219; 358/217; 358/223
[58] Field of Search ............. 358/219, 211, 218, 217, 358/139, 223

[56] References Cited

U.S. PATENT DOCUMENTS

| | | | |
|---|---|---|---|
| 2,402,053 | 6/1946 | Kell | 358/211 |
| 2,700,066 | 1/1955 | Vorms | 358/217 |
| 4,206,480 | 6/1980 | Ushijima | 358/219 |
| 4,331,980 | 5/1982 | Ryan | 358/219 |
| 4,365,271 | 12/1982 | Blom | 358/219 |
| 4,503,466 | 3/1985 | Ryan | 358/219 |

FOREIGN PATENT DOCUMENTS 2010053 of 1979 United Kingdom .

Primary Examiner—Gene Z. Rubinson
Assistant Examiner—Stephen Brinich
Attorney, Agent, or Firm—Marc D. Schechter

[57] ABSTRACT

In a television camera having at least one pickup tube, it is desirable to generate an electron beam with a current intensity which is greater than that necessary for obtaining a picture signal with a nominal amplitude between a black level and a white value. This prevents comet tails from being produced on the display behind brighter, moving scene portions. The electron beam intensity is adjusted by blanking the electron beam periodically during at least one field period and within the field period during at least a portion of a line period of a number of consecutive lines. The electron beam is properly set when the picture signal amplitude is observed to be maximum at a substantially minimum beam current intensity.

8 Claims, 1 Drawing Figure

METHOD OF ADJUSTING THE CURRENT INTENSITY OF AN ELECTRON BEAM IN A PICKUP TUBE AND TELEVISION CAMERA SYSTEM SUITABLE THEREFOR

BACKGROUND OF THE INVENTION

The invention relates to a method of setting the current intensity of an electron beam in a pickup tube of a television camera. In such a camera, the electron beam scans a target plate electrode in the pickup tube.

A television camera system employing such a method is described in Netherlands Patent Application No. 8,104,143 (corresponding to U.S. Pat. No. 4,331,980). In the television camera, an image of a scene being recorded is formed on the target plate electrode. The image generates a potential pattern on the target which corresponds to the brightness of the image of the scene. Brighter scene portions generate higher potentials on the target than dimmer scene portions.

Portions of the target having a higher potential than a nominal potential can be stabilized by increasing the beam current in one single field scan. For example, increasing the beam current intensity above the nominal value, such as to twice the nominal value, increases (doubles) the charge transfer to the target plate electrode. If, however, the maximum possible charge transer is not sufficient, stabilization in one single field scan cannot occur. On display of the picture signal, this results in comet tails behind moving, very bright scene portions. The stabilization then requires more than one single field scan.

In order to increase the beam current sufficiently to eliminate comet tails, but not excessively to cause defocussing, it is known, to increase a camera lens aperture by means of a diaphragm by a factor of two times the nominal opening. The luminous flux is then increased also by a factor of two, and the beam current is set such that on display of the generated picture signal no comet tails appear behind very bright scene portions.

It is an object of Netherlands Patent Application 8,104,143 to provide a beam current setting method in which no changes are made in the optical path of the camera, as such changes might give rise to several diasadvantages and problems. To that end, each field scan of the pickup tube target is made at a variable rate. More specifically, the target is scanned alternately at half the nominal rate, twice the nominal rate and half the nominal rate, each over one-third of the field scan. As a result, in the central third of the field the doubled scan rate halves the possible charge transfer via the electron beam or halves the effective beam current intensity, so that at very bright scene portions the picture is disturbed. The nominal beam current is now increased until there are no distorted scene portions any longer in the central third part of the picture. Therefore the normal field scan follows.

SUMMARY OF THE INVENTION

It is an object of the present invention to provide a beam current setting method which does not make changes in the optical path of the camera, and which does vary the field scan rate. It has been found that varying the field scan rate causes transition and crosstalk phenomena and nonlinearities, which may be particularly expected at double the rate of field scan.

In the method according to the invention, therefore, during the setting of the beam current, the electron beam current is suppressed periodically before each field period. The electron beam current is so suppressed during $(n-1)$ preceding field periods and within those field periods during at least a portion of a line of at least a plurality of consecutive lines, where n is an integer greater than one. The beam current intensity is set to correspond to the maximum picture signal amplitude to be reached.

In order to minimize beam current blanking, the plurality of consecutive line periods in which the electron beam current is suppressed is at least four line periods.

In a simple embodiment of the method according to the invention, the electron beam current is suppressed during all lines in at least the preceding field period.

A television camera system for performing the method according to the invention comprises a synchronized beam current blanking circuit coupled to the electron gun in the camera pickup tube. A picture signal peak detector is coupled to the pickup tube output.

The television camera system may then comprise a television camera, optionally having a remote camera control unit, tape recording and display devices and optionally picture and/or waveform display devices at the camera or at the control unit.

In a further embodiment of a television camera system according to the invention, the picture signal peak detector is a waveform display device and the camera system comprises a manually adjustable beam current setting circuit.

In another embodiment the picture signal peak detector is a signal peak detection circuit having an output coupled to an automatic beam current setting circuit.

DESCRIPTION OF THE PREFERRED EMBODIMENTS

Figure 1:
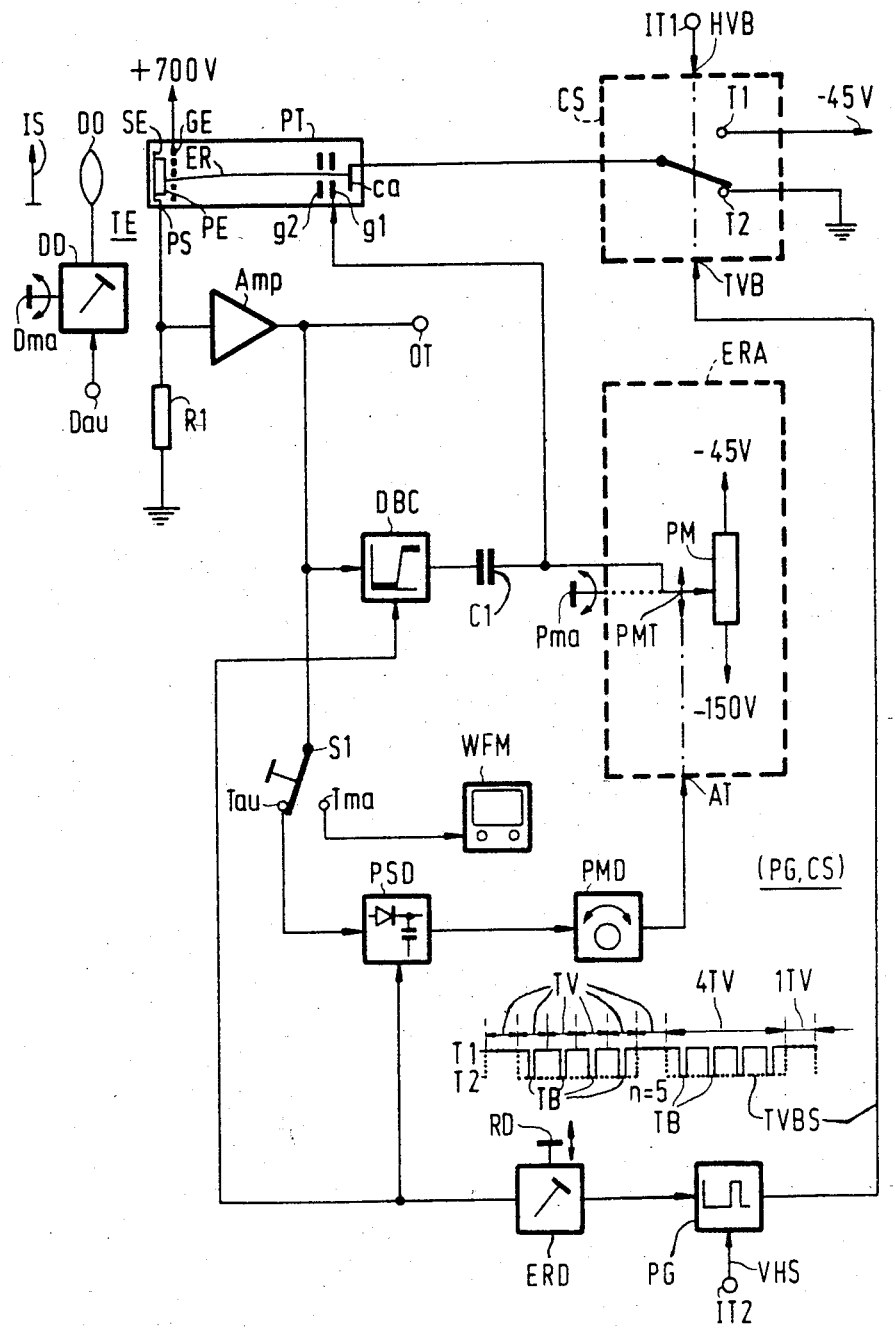
FIG. 1 schematically shows a television camera system according to the invention.

In FIG. 1, PT is a television pickup tube which forms part of a television camera system. This television camera system may be suitable for standardized or non-standardized black-white or color television. One or more pickup tubes PT may be used in the latter case.

The pickup tube PT is provided in a television camera which is combined with a camera control unit either remote from or integral with the camera. Picture and waveform display devices and picture pickup and display devices for storing picture information may form part of the camera system. In FIG. 1, a waveform display device is denoted by WFM. The device WFM is, for example, provided in the remote camera control unit. DO is arranged in front of the pickup tube PT.

In FIG. 1, a diaphragm aperture DO is arranged in front of the pickup tube PT. The diaphragm aperture DO is coupled to a diaphragm control device DD. The control device DD may have a manual control Dma and/or a control input terminal Dau. For automatic control of the diaphragm aperture DO, a control signal is applied to the terminal Dau.

Light originating from, for example, a scene IS is incident on the pickup tube PT via the diaphragm aperture DO. In the pickup tube PT, the light passes through a window to a target plate electrode TE. Target TE is made of a transparent, electricaly conductive metal layer (signal electrode SE) and a photosensitive semiconductor layer PE.

The light originating from the scene IS is converted in the photosensitive semiconductor layer PE into a potential image which corresponds to the scene image. The potential image is built up in the semiconductor layer PE during a light integration period by the absorption of photons from the incident light. The scene IS may be a scene to be recorded, a test pattern chart located in front of the camera, or a test pattern slide in the camera and projected onto the target plate electrode TE.

In the pick-up tube PT the semiconductor layer PE of the target plate electrode TE is scanned in lines and fields by an electron beam ER. The signal electrode SE of the target plate electrode TE is connected to an output from which a picture signal PS, of the pick-up tube PT, is obtained. The output is further connected to ground via a resistor R1. During the field scan of the target plate electrode TE the potential image on this electrode is converted into an electrode current through the resistor R1. The corresponding voltage drop across the resistor R1 results in the picture signal PS. Picture signal PS is amplified at a signal amplifier Amp having an output OT. The amplifier Amp may be a preamplifier, which may be followed by further amplifiers.

In the pickup tube PT, there are also a cathode ca, a first electrode g1 and a second electrode g2, which components together make up an electron gun (ca, g1, g2). The electron gun is capable of producing the electron beam ER. The electrode g1 is a current setting and control electrode and the electrode g2 is an anode electrode. A mesh electrode GE is arranged near the target plate electrode TE. For the sake of simplicity, further electrodes have been omitted from FIG. 1.

Outside the pickup tube PT, the cathode ca is connected to a controlled electronic switching circuit CS. For the sake of simplicity, switching circuit CS is shown as a mechanical switch having two terminals T1 and T2. The terminal T1 is connected to a supply voltage of, for example, −45 V. The terminal T2 is connected to ground. The −45 V supply voltage is supplied by a voltage source, not shown, whose other terminals provide other voltages, or are connected to ground.

The mesh electrode GE is connected to a In voltage of, for example, +700 V.

The controlled switching circuit CS is switched by applying a switching signal to a switching input HVB or TVB. The signal supply to the switching input TVB is a part of the invention and will be further discussed below. The switching input HVB is connected to a switching input terminal.

A line and field blanking signal, which is customary in television, is applied to input HVB. In line and field blanking periods the terminal T2 is connected to the cathode ca. The electron beam ER is then blanked (suppressed). No current can flow via the resistor R1, the target plate electrode TE, the beam ER, the cathode ca and the switching circuit CS because both T2 and resistor R1 are connected to ground. Outside the line and field blanking periods, the terminal T1 (which supplies the −45 V voltage) is connected to the cathode, so that from the terminal T1 electrons can flow via the electron beam ER through the resistor R1 and to the mesh electrode GE.

The current intensity of the electron beam ER is predominantly determined by the voltage at the first grid g1. The current distribution over the resistor R1 and the mesh electrode GE depends on the potential in the potential image on the target plate electrode TE in the region where the electron beam ER is incident. Disregarding the voltage drop across the electron beam ER, the semiconductor layer PE of the target plate electrode TE is brought to −45 V by the electron beam. The charge required is therefore deposited in situ by the electron beam ER and the superfluous charge in the beam ER is conveyed to the mesh electrode GE.

The deposited charge on the target corresponds to the current flowing through the resistor R1. The semiconductor layer PE of the target plate electrode TE is stabilized at (substantially) −45 V. With an increasing luminous flux on the target plate electrode TE more charge is deposited there by the electron beam ER to provide the stabilization, until ultimately all the available charge has ben deposited. With a still further increasing supply of light the target plate electrode TE can no longer be stabilized at the voltage of −45 V, thus producing a comet tail effect.

FIG. 1 shows that the first grid electrode g1 is connected to a tap PMT of a potentiometer PM arranged between two terminals supplying voltages of −45 V and −150 V, respectively. A less negative voltage at the potentiometer tap PMT causes the electron gun (ca, g1, g2) to produce, via the electrode g1, an electron beam ER with a higher current intensity, and vice versa. The desired beam current intensity can be set by means of a manual control Pma. The potentiometer PM and the control Pma form a beam current setting circuit ERA which may also have a setting input AT for receiving a setting signal when an automatic setting feature is desired.

In addition to the beam current setting circuit ERA with the manual or automatic setting of the beam current intensity, it is possible, as shown in FIG. 1, to provide a dynamic beam current control circuit DBC. The circuit DBC has an input which is connected to the output of the amplifier Amp. An output of circuit DBC is connected to the first grid electrode g1 via a coupling capacitor C1. The circuit DBC comprises a threshold and limiting circuit with the aid of which, without oscillations, the current intensity of the electron beam ER can be adjusted dynamically as a function of the potential differences in the potential image on the target plate electrode TE. A dynamic beam control circuit which operates adequately in practice is described in United Kingdom Patent No. 2,010,053 (corresponding to U.S. Pat. No. 4,365,271). When used in the camera with a pickup tube (PT) having an anticomet tail gun, further circuits required therefor may be present.

Thus far, United Kingdom Pat. No. 2,010,053 discloses a television camera having a pickup tube PT, an amplifier Amp, a controlled switching circuit CS having the switching input HVB, a beam current setting circuit ERA, and a dynamic beam current control circuit DBC. The voltages given above are examples only and they may each be assumed to be further increased by +45 V when it is desired to stabilize the potential image at the OV ground potential.

In order to perform the method according to the invention, the camera system includes a control device ERD for setting the beam current. Control device ERD can be operated by an "on/off" control RD. When the device ERD is operated, the circuit DBC is made inoperative, as it must not affect the setting of the beam current intensity.

Next, we will assume that control device ERD is turned on and the luminous flux received from the scene IS has a light intensity which is less than the desired value at which the beam current should be set. This is a reasonable assumption because when a test pattern chart in the diaphragm aperture DO is already at its maximum opening. If the scene IS is a test slide projector the maximum light intensity is usually not sufficiently large to cause comet tails. Also, the color composition of the projector light may be different from the color composition of the light coming from the scene to be recorded by the camera after the beam current is set. When the color composition of the test light differs to a significant extent from the color composition of the future scene light problems occur, especially with a color television camera having several pickup tubes. When the test light contains, for example, a smaller blue light component than the future scene light, it is very difficult to set the beam current in an optimum way at the "blue" pickup tube.

For the reasons discussed above, we have assumed that before and during the setting of the beam current the light intensity is not altered at the diaphragm aperture DO or at the scene IS. When the device ERD is now turned on, the decision can be made whether to set the beam current automatically or manually by operating switch S1.3 having terminals Tau and Tma. The output of the amplifier Amp is connected to a terminal of the switch S1 which is connected to either the terminal Tau or Tma. The terminal Tma is, for example, connected to an input of the waveform monitor WFM. As will become clear below, monitor WFM can be used as a picture signal peak detector to manually set the beam current.

The terminal Tau of switch S1 is connected to one input of a picture signal peak detection circuit PSD. Another input of the circuit PSD is connected to the device ERD, which activates peak detection circuit PSD. Via a drive circuit PMD an output of the circuit PSD is connected to the setting input AT of the beam current setting circuit ERA, to readjust the potentiometer tap PMT until a maximum picture signal amplitude is detected by the circuit PSD.

An output of the device ERD is also connected to an input of a pulse generator PG. Another input of pulse generator PG receives a synchronizing signal VHS via an input terminal IT2. The signal VHS comprises at least field synchronizing pulses and possibly line synchronizing pulses depending on the structure of the signal TVBS to be produced by the pulse generator PG. The output of the pulse generator PG, which provides the signal TVBS, is connected to the switching input TVB of the controlled switcing circuit CS. As described above, when switching circuit CS is in the T2 position, the electron beam ER in the pickup tube PT is blanked. The pulse generator PG and the controlled switching circuits CS therefore operate as a synchronized beam current blanking circuit.

Let is be assumed that the signal TVBS which is input to the switching circuit CS dominates the signal supplied to the switching input HVB of circuit CS when, under the control of the signal TVBS, the switching circuit CS is in the T2 position. When the signal TVBS switches the circuit CS to T1, the line and field blanking signal applied to the switching input HVB controls the switching between the terminals T1 and T2.

After the control device ERD has been activated to set the beam current, the signal TVBS is active at the switching circuit CS. In the signal TVBS, (shown in FIG. 1 as a function of time), TV denotes some field periods and 4TV and 1TV together denote a time duration with n=5 field periods, which periodically occur in the beam setting period. TB denotes a small portion of some field periods TV occurring approximately in the middle of each field. The time period TB comprises a plurality of consecutive line periods of, for example, a variable number.

The signal TVBS is shown in two cases as solid and as dotted lines, respectively. As shown by the dotted line, prior to the field period 1TV the electron beam ER is blanked during all lines of the four preceding field periods 4TV. This results in the target plate electrode TE being scanned once every n=5 field periods. The light integration period for the target plate electrode TE is therefore increased by a factor of five. The potential image on the target plate electrode TE now requires a five times greater charge transfer via the electron beam ER during the field 1TV for stabilizing the picture signal. When the beam current is set manually, the camera operator readjusts the manual control Pma of the potentiometer PMT while observing the display screen of the waveform display device WFM. The potentiometer is readjusted until no further picture signal amplitude increase can be observed on the display device WFM. This indicates that the current intensity of the electron beam ER has been optimized for stabilization at the target plate electrode TE.

When the solid-line signal TVBS is generated by pulse generator PG, not all the line periods in the four field periods 4TV are blanked, but a plurality of consecutive line periods occurring in the periods TB are blanked. Outside the periods TB the field is scanned normally. This results in a bright, horizontal picture strip corresponding to the period TB being displayed. The beam current now set manually is effected to provide a maximum picture signal amplitude in the picture strip with a minimum beam current required therefor.

Since during the customary interlaced field only alternate lines are scanned, it is desirable to blank a picture strip of more than one line for setting the beam current. At a minimum, at least the same four consecutive lines should be blanked during each field.

In addition, it is possible to blank the electron beam ER only during one or more portions of line periods instead of during entire line periods. If during the blanked field periods, the electron beam ER is not totally blanked during all line periods but only during a portion thereof, for example the first half, the left half of a displayed television picture, can then be observed for setting the beam current. Also, the electron beam ER need not be blanked during the entire line period for the above-mentioned plurality of consecutive line periods. A sort of window in the center of a display picture might be blanked.

An alternative blanking scheme can be achieved when during the "blanking" field periods the electron beam ER is blanked during several groups of consecutive lines (either during each line entirely or partially).

In all of the described blanking schemes, the beam current intensity is increased until a maximum picture signal amplidue which no longer increases is detected. Alternatively, the beam current intensity is reduced until a decrease of the picture signal amplitude is detected. In both cases the adjusted current intensity is the minimum intensity sufficient for stabilizing the potential image.

For automatically setting the beam current intensity, a microcomputer or a microprocessor can be used. The microprocessor cooperates with the control device ERD, the drive circuit PMD for the potentiometer tap PMT and, possibly, the picture signal peak detection circuit PSD. In addition, the beam current setting circuit ERA, shown by way of example with the potentiometer PM, may be provided with a digitally controlled voltage source. As an alternative to the use of the picture signal peak detection (PSD), it would be possible to calculate the minimum beam current intensity for the maximum picture signal amplitude with the aid of the microcomputer or microprocessor after a number of measurements of the picture signal amplitude after a number of readjustments.

What is claimed is:

1. A method of adjusting the beam current of the scanning electron beam in a television pickup tube having a target, said tube producing a picture signal, said method comprising the steps of:

repeatedly scanning the electron beam across the target at a fixed scanning rate, each complete scan of the target being a scan cycle;

suppressing the electron beam current as the electron beam is scanned across a selected area of the target over a selected number of one or more consecutive scan cycles in order to integrate charge generation at the selected area of the target;

reading out the charge integrated at the selected area of the target by scanning the selected area of the target over one scan cycle with the beam current at its nonsuppressed setting;

repeating the steps of suppressing and reading out; and adjusting the nonsuppressed beam current setting to the lowest nonsuppressed beam current which produces the maximum picture signal from the selected area of the target.

2. A method as claimed in claim 1, characterized in that the selected area of the target has a height of at least four line scans of the electron beam.

3. A method as claimed in claim 2, characterized in that the electron beam is suppressed as it is scanned across at least two noncontiguous selected areas of the target.

4. A method as claimed in claim 1, characterized in that the electron beam is suppressed as it is scanned across the entire target.

5. A television camera system comprising:

a television pickup tube having a target, said tube producing a picture signal;

means for generating an electron beam in the pickup tube, said electron beam having a beam current;

means for repeatedly scanning the electron beam across the target at a fixed scanning rate, each complete scan of the target being a scan cycle;

a beam current blanking circuit, said beam current blanking circuit when in a first state suppressing the electron beam current as the electron beam is scanned across a selected area of the target over a selected number of one or more consecutive scan cycles in order to integrate charge generation at the selected area of the target, said beam current blanking circuit when in a second state allowing the beam current to remain at its nonsuppressed setting when scanning the selected area of the target over one scan cycle so as to read out the charge inegrated at the selected area of the target;

means for alternately switching the beam current blanking circuit between its first and second states;

means for adjusting the nonsuppressed beam current setting; and a picture signal peak detector for determining the lowest beam current which produces the maximum picture signal from the selected area of the target.

6. A television camera system as claimed in claim 5, characterized in that:

the means for adjusting the nonsuppressed beam current setting is manually operable; and the picture signal peak detector comprises a waveform display device.

7. A television camera system as claimed in claim 5, characterized in that:

the means for adjusting the nonsuppressed beam current setting comprises a beam current setting circuit having an input; and the picture signal peak detector has an output connected to the input of the beam current setting circuit for automatically setting the beam current.

8. A method of adjusting the beam current of the scanning electron beam in a television pickup tube having a target, said tube producing a picture signal, said method comprising the steps of:

repeatedly scanning the electron beam across the target at a fixed scanning rate, each complete scan of the target being a scan cycle;

suppressing the electron beam current as the electron beam is scaned across a selected area of the target over a selected number of one or more consecutive scan cycles in order to integrate charge generation at the selected area of the target, said selected area of the target being less than the entire area of the target;

reading out the charge integrated at the selected area of the target by scanning the selected area of the target over one scan cycle with the beam current at its nonsuppressed setting;

repeating the steps of suppressing and reading out; and adjusting the nonsuppressed beam current setting to the lowest nonsuppressed beam current which produces the maximum picture signal from the selected area of the target.

* * * * *